Figure 1:
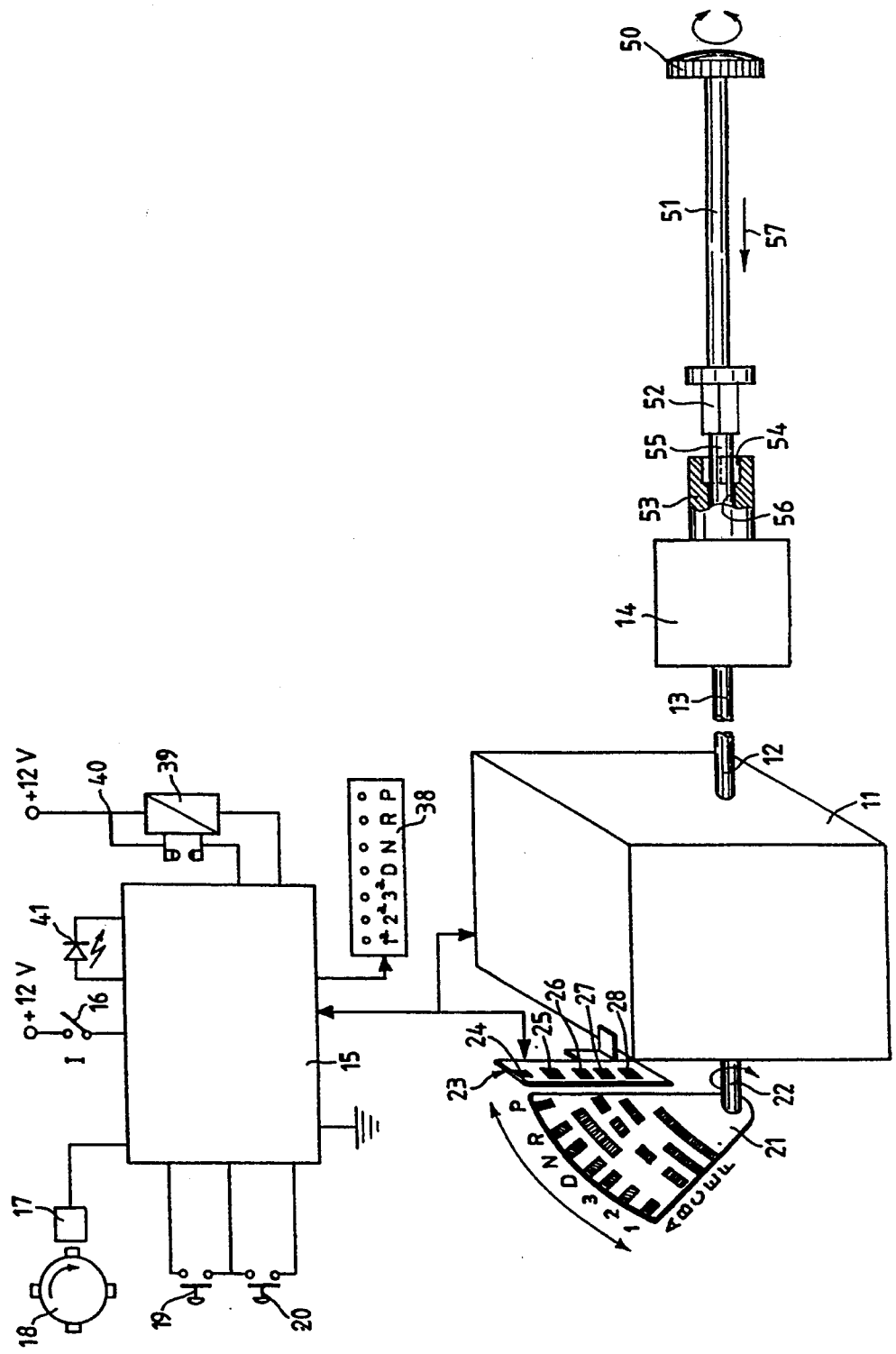

United States Patent [19]

Moscatelli

[11] Patent Number: 5,370,015

[45] Date of Patent: Dec. 6, 1994

[54] ELECTRONIC DEVICE FOR GEAR SELECTION IN AN AUTOMATIC TRANSMISSION FOR MOTOR VEHICLES WITH HALL EFFECT SENSORS AND MANUAL BACKUP SHAFT

[75] Inventor: Saverio Moscatelli, Milan, Italy

[73] Assignee: Fiat Auto S.p.A., Turin, Italy

[21] Appl. No.: 968,418

[22] Filed: Oct. 29, 1992

[51] Int. Cl.⁵ .................. B60K 41/06; G01B 7/14
[52] U.S. Cl. ................... 74/335; 74/473 R; 324/207.2
[58] Field of Search .............. 74/335, 473 R, 483 PB, 74/476; 324/207.2, 207.24

[56] References Cited

U.S. PATENT DOCUMENTS

| 4,291,586 | 9/1981 | Buetemeister | 74/335 |
|---|---|---|---|
| 4,610,179 | 9/1986 | Parker | 74/335 |
| 4,726,260 | 2/1988 | Lovrenich et al. | 74/335 X |
| 5,094,115 | 3/1992 | Michihira et al. | 74/335 |
| 5,156,243 | 10/1992 | Aoki et al. | 74/335 X |
| 5,161,422 | 11/1992 | Suman et al. | 74/335 |
| 5,307,013 | 4/1994 | Santos et al. | 324/207.2 |

FOREIGN PATENT DOCUMENTS

| 0245216 | 11/1987 | European Pat. Off. . | |
|---|---|---|---|
| 2638402 | 5/1990 | France . | |
| 3743259 | 6/1989 | Germany | 74/335 |
| 3841373 | 7/1989 | Germany . | |
| 59-23733 | 2/1984 | Japan . | |
| 3-229051 | 10/1991 | Japan | 74/335 |
| WO9217719 | 10/1992 | WIPO | F16H 59/08 |

Primary Examiner—Dirk Wright
Assistant Examiner—Khoi Q. Ta
Attorney, Agent, or Firm—Cushman Darby & Cushman

[57] ABSTRACT

An electronic device for gear selection in an automatic transmission for motor vehicles, comprising a plurality of digital sensors for determining the angular position of rotation of a gear selection shaft emerging from the automatic transmission and rotatable to engage the various gears by a stepping motor operable in both directions, the digital sensors and the stepping motor being electrically connected to a digital electronic operating and control unit which can process coded electrical signals emitted by the plurality of digital sensors as the angular position of the selection shaft varies, a pair of electrical actuators being provided to drive the stepping motor through at least one step at a time in one direction of rotation and/or the other.

9 Claims, 2 Drawing Sheets

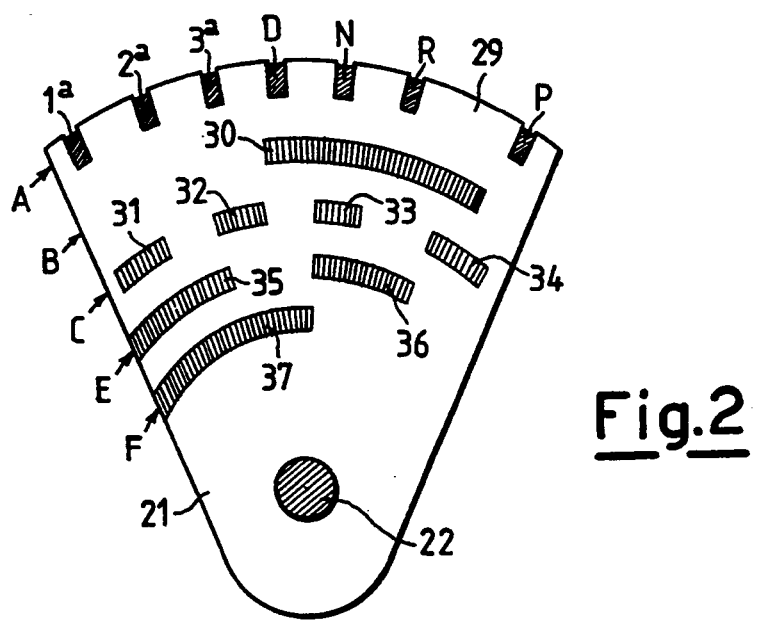
Fig.2
Fig.3
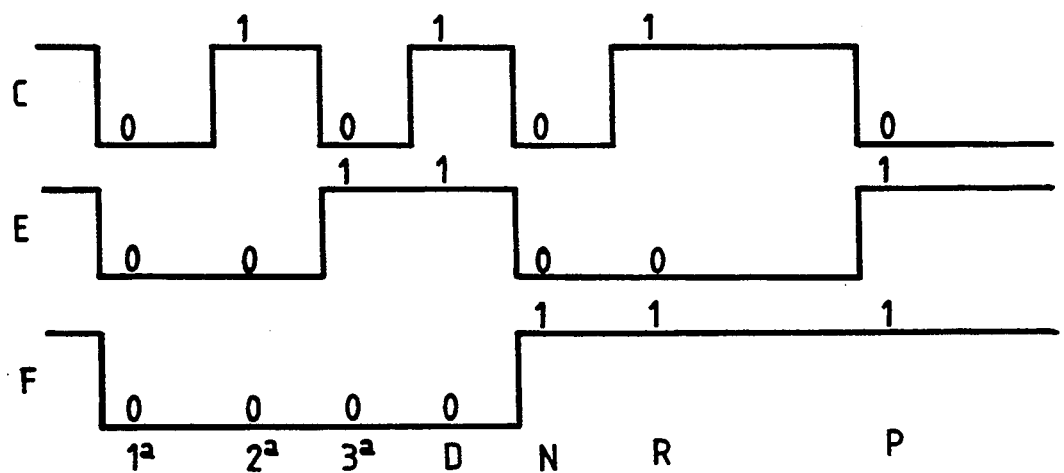

ELECTRONIC DEVICE FOR GEAR SELECTION IN AN AUTOMATIC TRANSMISSION FOR MOTOR VEHICLES WITH HALL EFFECT SENSORS AND MANUAL BACKUP SHAFT

This invention relates to an electronic device for gear selection in an automatic transmission for motor vehicles.

In motor vehicles comprising an automatic transmission, a gear selection lever is provided which, when suitably positioned, determines the various transmission operating states and/or positions available. The lever positions for selection mainly comprise a park position, a drive position, a reverse position and a neutral position.

As stated, the various possible gear selection positions have to be selected by the vehicle driver, with the result that during the gear shifting operation the driver may make an unacceptable or dangerous lever movement which could endanger driving or damage the transmission.

For example it is always possible, particularly at the moment of vehicle stoppage, for the driver to inadvertently forget to position the gear lever in the park position, with the result that the vehicle is free to move, hence creating a dangerous condition.

An object of the present invention is to provide a device for gear selection in an automatic transmission which overcomes these drawbacks, and, in addition, totally eliminates the need for direct manual operation of the selection lever associated with the transmission.

A further object is to provide a gear selection device of the aforesaid type having maximum reliability in terms of the correct variation and/or succession between one gear and another and also allowing the transmission position to be checked while the vehicle is at rest.

These objects are attained according to the present invention by an electronic device for gear selection in an automatic transmission for motor vehicles, comprising a plurality of digital sensors for determining the angular position of rotation of a gear selection shaft emerging from said automatic transmission and rotatable to engage the various gears by a stepping motor operable in both directions of rotation, the digital sensors and the stepping motor being electrically connected to a digital electronic operating and control unit which can process coded electrical signals emitted by the plurality of digital sensors as the angular position of the selection shaft varies, and a pair of electrical actuators being provided to drive the stepping motor through at least one step at a time in one direction of rotation and/or the other.

Advantageously, the device according to the present invention permits the manipulation of the gear selection lever to be replaced by the operation of two electrical actuators. These actuators are conveniently connected to an electronic processing unit which controls the operation of the automatic transmission on the basis of signals received and emitted in a predetermined succession and/or correlation of relative sensor positions. The structural and operational characteristics and the advantages of the gear selection device according to the present invention will be more apparent from the description given hereinafter by way of non-limiting example with reference to the accompanying schematic drawings, in which:

FIG. 1 shows a schematic embodiment of the device according to the invention associated with an automatic transmission, shown partly in perspective;

FIG. 2 is an enlarged side elevational view of part of the sensor unit consisting of a rotatable non-magnetic support carrying a plurality of permanent magnets forming part of the device of FIG. 1; and FIG. 3 is a graph which schematically represents a functional correlation between the series of gear-indicating permanent magnets arranged on the support of FIG. 2, as the position of the gear selection lever varies.

FIG. 1 shows schematically an electronic device for gear selection in an automatic transmission for motor vehicles according to the present invention. The electronic device comprises at one end a stepping motor 11 mechanically connected by a first shaft 12 and levers (not shown) to a second gear selection shaft 13 entering an automatic transmission 14.

The electronic device according to the present invention comprises essentially an electronic processing unit 15, such as an electronic logic control and power center connected on one side to a switching and powering device, indicated generally as a switch assembly 16. The electronic unit 15 is also connected to a speed measuring device 17 consisting of a tachometer sensor which measures the vehicle running speed by the rotation of a shaft 18, such as a vehicle wheel axle.

The electronic unit 15 is also connected to and operationally controlled by a pair of electrical actuators 19 and 20, usually consisting of two pushbuttons or switches, which cause the first stepping motor shaft 12 and the second gear selection shaft 13 to rotate in one direction or the other, with consequent successive gear shifts.

A plurality of permanent magnets are mounted on an extension 22 of shaft 12, which is connected to the gear selection shaft 13. In addition a plurality of magnetic sensors are mounted on the casing of the stepping motor 11.

The use of permanent magnets enables magnetic fields to be generated which are practically constant over time without undergoing wear, as would happen if using, for example, sliding contacts. For example the magnetic sensors consist of Hall effect sensors comprising a conducting foil traversed by electric current, a potential difference being induced in this foil whenever it is immersed in a magnetic field. In this manner the magnets act on the magnetic sensors without any mechanical contact, thereby minimizing wear and damage.

The gear selection shaft 13 can undergo predetermined rotations in the sense that it can assume only a finite number of positions, each of which having a determined corresponding engaged gear of the automatic transmission 14 so that by using digital sensors it is possible to determine which gear has been engaged.

FIG. 1 is a partly perspective view of two supports of non-magnetic material such as aluminium, these providing a first support 21 fixed to the extension 22 of the shaft 12 of the stepping motor 11, and a second support 23 to be fixed to the casing of the stepping motor 11. In the illustrated embodiment, the plurality of permanent magnets fixed to the rotatable support 21 consist of five different series of permanent magnets indicated respectively by A, B, C, E and F. The plurality of magnetic sensors are fixed to the casing of the stepping motor 11, which comprises five sensors indicated respectively by 24, 25, 26, 27 and 28, which are electrically connected to the electronic unit 15 via appropriate wiring or the like.

The illustrated embodiment is merely a preferred embodiment in that a different number of sensors and magnets could be used in a different arrangement.

As shown more clearly in FIG. 2, the first support 21 is shaped as an isosceles trapezium or a circumferential sector and carries the series of permanent magnets along concentric circumferential arcs of decreasing diameter. At its top, for example within radial recesses in the peripheral circumference 29, the support 21 contains the first series A of permanent magnets corresponding to the various gears or positions assumable by the automatic transmission. In the illustrated embodiment these permanent magnets are seven in number and correspond to the park position P, the reverse position R, the neutral position N, the drive position D, the 3rd gear position 3, the 2nd gear position 2 and the 1st gear position 1.

The second series of magnets B consists of a magnet 30 aligned radially on one side with the centre of rotation of the extension 22 of the stepping motor shaft 12, and on the other side with the magnets D, N and R of the peripheral series A.

The third series of magnets C consists of four magnets 31, 32, 33 and 34 radially aligned with the peripheral magnets 1, 3, N and P of the series A.

The fourth series of magnets E consists of two magnets 35 and 36 radially aligned with the peripheral magnets 1, 2, N and R of the series A. Finally, the fifth series of magnets F is arranged on an inner circumference of smaller diameter than the preceding, and consists of a long magnet 37 radially aligned with the peripheral magnets 1, 2, 3 and D of the series A.

The graph of FIG. 3 is a binary representation of the correspondence between the sensor series C, E and F in indicating the automatic transmission gears.

In this respect, it is important to note that the Hall effect digital magnetic sensors, as used for example in the present invention, have the property of electrically generating a logic "0" whenever they are exposed to a magnetic field, and of generating a logic "1" in the opposite case.

In this manner, a doubly unambiguous correspondence between the engaged gears and the corresponding coded electrical signals generated by the sensors is obtained, such that these signals can be unambiguously identified and used by any digital electronic circuit or electronic unit.

A display unit 38 and a relay 39 with normally open contacts (closed when the ignition key is inserted) connected into an engine power line 40 are connected to the electronic unit 15.

The electronic device for gear selection in an automatic transmission for motor vehicles according to the present operates in the following manner.

Upon inserting the ignition key, the vehicle engine can be started only if in the park or neutral position; that is when the sensor 24 faces the permanent magnet in position P or the permanent magnet in position N of the first series of magnets A. These positions are also indicated on the display unit 38 by virtue of the mutual arrangement of the magnet series C, E and F shown in the diagram of FIG. 3. For example, when in the park position the sensors 24 and 26 are exposed to the magnetic field generated by the magnets P and 34, respectively, whereas when in the neutral position the sensors 25, 26 and 27 are exposed to the magnetic field generated by the magnets N, 30 and 36, respectively. By virtue of its preset logic, the electronic unit 15 allows the engine to be started when the sensors and magnets are in these relative positions.

If the electrical pushbutton 19 is now pushed once, the reverse position is achieved as the electronic unit 15 feeds a signal for rotating the stepping motor 11 through one step. The required operation of the automatic transmission 14 is therefore achieved, and the position attained is confirmed by the fact of the magnet R of the first series A being in a position corresponding with the sensor 24.

This selection is also indicated by the display unit 38, in that the sensor 27 is exposed to a magnetic field generated by the magnet 36 of the series E. When in this position the reversing lights of the automobile (not shown) are also operated. It should be noted that, as in the case of all automatic transmission vehicles, the brake governs the vehicle movement in the normal manner.

If it is required to put the vehicle into gear from the park position while keeping the brake pressed, the pushbutton 19 must be pressed a predetermined number of times sufficient to attain such gear. For example, pushbutton 19 must be pressed once to attain first gear (1), etc. The sensors 24, 26, 27 and 28 are thus exposed to a magnetic field generated by the magnets 1, 31, 35 and 37. This arrangement is achieved by the stepping motor undergoing the required number of steps under the control of the electronic unit 15. For every other position either the pushbutton 19 is operated in the described manner, while pushbutton 20 returns or shifts the gear by reverse movement of the stepping motor 11.

The second permanent magnet series B, consisting in the illustrated example of the magnet 30, acts when in the automatic drive position as a safety device if the signal obtained by the tachometer sensor 17 indicates a vehicle speed exceeding a first level, for example 5 km/h, or exceeding a second level, for example 180 km/h.

As the magnet D faces the sensor 24, the magnet 30 will face the sensor 25, to actuate a logic safety device. In this respect it prevents gear shift into the neutral, reverse or park position of the automatic transmission at permanent magnets N, R and P when the vehicle is above the first speed level even if the pushbutton 20 is depressed.

In addition to the prevention of gear shifts into the abovementioned positions, when the vehicle travels above the second speed level, detected by the tachometer sensor 17, it also prevents a shift into third gear even if the pushbuttons 19 and 20 are activated, hence preventing over-running.

An LED indicator 41 is also provided, and only below the first speed level, indicating proper operation of the tachometer sensor 17, and turns off when the vehicle reaches a speed above said first level.

If it lights above this threshold first level, it indicates malfunction of the tachometer sensor 17.

Advantageously in a device according to the present invention, when the ignition key is removed, the electronic unit 15 automatically returns the automatic transmission to the park position. In this respect, the engine power line 40 contains the relay 39 which remains closed until the automatic transmission reaches the park position. Only at this point do the contacts of the relay 39 open to cut power to the electronic unit or control center 15. Hence, even if the driver forgets to operate the pushbuttons 19 and/or 20 to shift the automatic transmission into the park position on vehicle stoppage, the electronic unit 15 does this completely automatically.

Advantageously, the electronic gear selection device according to the present invention is also provided with means which enable gears to be selected even if the stepping motor 11 malfunctions. To achieve this result, a manual gear actuator device operable from the interior of the motor vehicle is provided associated with the shaft 12 of the stepping motor 11.

This manual actuator device consists essentially of a knob 50 rotatable into a series of positions corresponding to the gear positions. Rigid with the knob 50 there is a semi-flexible transmission rod or cable 51, consisting for example of a remote control such as a Bowden cable, at the end of which a male hexagonal engagement element 52 is provided.

An extension 53 to the gear selection shaft 13 is provided, emerging from the transmission 14 at a side opposite to that on which said gear selection shaft 13 is connected to the shaft 12 of the stepping motor 11. In the extension 53 there is provided a female hexagonal seat 54 able to receive the mate hexagonal engagement member 52. To ensure that the male hexagonal engagement member 52 and the female hexagonal seat 54 of the extension 53 are aligned but not in continuous mutual engagement during normal operation of the electronic gear selection device, a cylindrical guide shaft 55 is provided and is able to slide freely within a complementary cylindrical hole 56 provided in the extension 53. It can be appreciated that if the stepping motor 11 develops a fault, the gears can be selected by operating the knob 50. This operation is achieved by first pushing the knob in the direction of the arrow 57 until the male hexagonal engagement member 52 is inserted in the female hexagonal seat 54, and then turning the knob 50 through an angle such as to engage the desired gear.

In this manner the transmission can be operated even if the stepping motor 11 malfunctions.

I claim:

1. A motor vehicle transmission system for electronic control of gear selection comprising:
   an automatic transmission;
   a rotatable gear selection shaft operably connected to said automatic transmission;
   a stepping motor for rotatably driving said gear selection shaft to enable said shaft to selectively engage a plurality of transmission gears as a function of an angular position of said shaft;
   an electronic control unit electrically connected to said stepping motor and having a pair of electrical switches;
   an electronic device for controlling gear selection in said motor vehicle, said electronic device comprising a plurality of sensors cooperable with plural series of magnetic elements to enable said sensors to be selectively electrically connected to said control unit and said stepping motor in a manner which
   i) permits said control unit to determine said angular position of said gear selection shaft, and which
   ii) enables said stepping motor to vary said angular position of said selection shaft when said electrical switches of said control unit are actuated; and
   a manual gear actuator selectively cooperable with said gear selection shaft to provide a backup manual control of said transmission.

2. A system as claimed in claim 1, wherein said plurality of sensors are a plurality of Hall effect sensors capable of detecting a magnetic field.

3. A system as claimed in claim 2, wherein said magnetic elements comprise a plurality of permanent magnets for generating a magnetic field which can be detected by said plurality of Hall effect sensors.

4. A system as claimed in claim 3, wherein said plurality of permanent magnets are connected to a shaft of said stepping motor, said stepping motor shaft being operably connected to said gear selection shaft.

5. A system as claimed in claim 2, wherein said magnetic elements comprise five series of permanent magnets for generating a magnetic field which can be detected by said plurality of Hall effect sensors.

6. A system as claimed in claim 1, further comprising a display unit and wherein said control unit is capable of activating said display unit for indicating which gear is engaged by said automatic transmission.

7. A system as claimed in claim 1, wherein said manual gear selection device comprises a knob connected to one end of a flexible remote control transmission member, said transmission member being operably connected to said gear selection shaft by engagement elements.

8. A system as claimed in claim 7, wherein said engagement elements comprise male and female hexagonal members positioned at an end of said gear selection shaft and at the said one end of said flexible transmission member, respectively.

9. A system as claimed in claim 7, wherein said flexible transmission member is a Bowden cable.

* * * * *

UNITED STATES PATENT AND TRADEMARK OFFICE
CERTIFICATE OF CORRECTION

PATENT NO. : 5,370,015
DATED : December 6, 1994
INVENTOR(S) : MOSCATELLI, Saverio It is certified that error appears in the above-indentified patent and that said Letters Patent is hereby corrected as shown below:

On the title page item [30], insert

--[30] Foreign Application Priority Data
Oct. 31, 1991 [IT] Italy - MI91 A 002905--.

Signed and Sealed this

Twenty-fifth Day of April, 1995

Attest:

BRUCE LEHMAN

Attesting Officer  Commissioner of Patents and Trademarks